(12) United States Patent
Fu et al.

(10) Patent No.: US 8,986,851 B2
(45) Date of Patent: Mar. 24, 2015

(54) HEAT SHIELDING MATERIAL AND METHOD FOR MANUFACTURING THE SAME

(75) Inventors: Huai-Kuang Fu, Fengyuan (TW); Sung-Jeng Jong, Pingtung Hsien (TW); Jer-Young Chen, Hsinchu (TW); Yih-Her Chang, Baoshan Township (TW); Pao-Tang Chung, Hsinchu (TW)

(73) Assignee: Industrial Technology Research Institute (TW)

( * ) Notice: Subject to any disclaimer, the term of this patent is extended or adjusted under 35 U.S.C. 154(b) by 24 days.

(21) Appl. No.: 13/040,780

(22) Filed: Mar. 4, 2011

(65) Prior Publication Data

US 2012/0138842 A1 Jun. 7, 2012

(30) Foreign Application Priority Data

Dec. 7, 2010 (TW) ............................... 99142537 A
Feb. 11, 2011 (TW) ............................... 100104518 A

(51) Int. Cl.
*E04B 1/74* (2006.01)
*B05D 3/00* (2006.01)
*B05D 5/00* (2006.01)
*C01G 41/02* (2006.01)
*C23C 18/12* (2006.01)

(52) U.S. Cl.
CPC ............ *C01G 41/02* (2013.01); *C23C 18/1216* (2013.01); *C23C 18/1233* (2013.01); *C23C 18/1237* (2013.01); *C23C 18/1245* (2013.01); *C23C 18/1279* (2013.01); *Y10S 977/775* (2013.01)
USPC .......... 428/689; 252/519.1; 252/62; 977/775; 423/606

(58) Field of Classification Search
None
See application file for complete search history.

(56) References Cited

U.S. PATENT DOCUMENTS

| 3,505,108 | A | | 4/1970 | Mochel | |
| 3,912,524 | A | * | 10/1975 | Flannery et al. | ............... 501/10 |
| 4,167,428 | A | * | 9/1979 | Sayles | ........................ 149/109.6 |
| 4,232,097 | A | | 11/1980 | Shanks et al. | |
| 4,462,883 | A | | 7/1984 | Hart | |
| 5,420,000 | A | * | 5/1995 | Patel et al. | .................... 430/332 |
| 5,922,488 | A | | 7/1999 | Marucchi-Soos et al. | |
| 7,601,881 | B2 | * | 10/2009 | Gillespie et al. | .............. 585/750 |
| 7,655,301 | B2 | | 2/2010 | Chonan et al. | |
| 8,304,099 | B2 | * | 11/2012 | Chung et al. | ................. 428/701 |
| 2006/0008640 | A1 | * | 1/2006 | Chonan et al. | ................ 428/328 |
| 2010/0178492 | A1 | | 7/2010 | Schicht et al. | |
| 2011/0143116 | A1 | * | 6/2011 | Chung et al. | ................. 428/220 |

FOREIGN PATENT DOCUMENTS

| CN | 1745149 | | 3/2006 |
| JP | 06-262079 | | 9/1994 |
| JP | 09-127559 | | 5/1997 |
| JP | 2005351651 | | 12/2005 |
| JP | 2008214596 | * | 9/2008 |
| JP | 2010002346 | | 1/2010 |

OTHER PUBLICATIONS

Office Action dated Apr. 10, 2014 from corresponding application No. CN201110031657.0.
Fardindoost, Somayeh et al., "Pd Doped Wo3 Films Prepared by Sol-Gel Process for Hydrogen Sensing", International Journal of Hydrogen Energy 35 ( 2010) pp. 854-860.

* cited by examiner

*Primary Examiner* — Vera Katz
(74) *Attorney, Agent, or Firm* — Lowe Hauptman & Ham, LLP

(57) ABSTRACT

A heat shielding material and method for manufacturing thereof is provided. The method for manufacturing the heat shielding material, includes: providing a tungsten oxide precursor solution containing a group VIII B metal element; drying the tungsten oxide precursor solution to form a dried tungsten oxide precursor; and subjecting the dried tungsten oxide precursor to a reducing gas at a temperature of 100° C. to 500° C. to form a composite tungsten oxide. The heat shielding material includes composite tungsten oxide doped with a group I A or II A metal and halogen, represented by $M_xWO_y$ or $M_xWO_yA_z$, wherein M refers to at least one of a group I A or II A metal, W refers to tungsten, O refers to oxygen, and A refers to a halogen element. The heat shielding material also includes a group VIII B metal element.

3 Claims, 12 Drawing Sheets

HEAT SHIELDING MATERIAL AND METHOD FOR MANUFACTURING THE SAME

CROSS REFERENCE TO RELATED APPLICATIONS

This Application claims priority of Taiwan Patent Application No. 99142537, filed on Dec. 7, 2010 and Taiwan Patent Application No. 100104518, filed on Feb. 11, 2011, the entirety of which is incorporated by reference herein.

BACKGROUND OF THE INVENTION

1. Field of the Invention

The present invention relates to a heat shielding material and a method for manufacturing the same, and in particular relates to an infrared (IR) reflection film and a method for manufacturing the same.

2. Description of the Related Art

Glass is generally heated at a high temperature of about 680° C. to 710° C. (in air) to strengthen an intensity thereof. Although, a protective layer may be coated onto a heat shielding film of the glass to prevent oxidization thereof, the extra step increases process complexity.

Alternatively, a heat shielding material may be coated onto the glass after the high temperature strengthening process so that the heat shielding performance of the glass does not deteriorate. Note that if tempered glass is subjected to a temperature higher than 300° C., strain therein would be released, thus causing the glass to lose its toughness. Tungsten oxide film is a well known heat shielding film with IR reflexivity. Tungsten oxide films are generally formed at a temperature above 500° C., and therefore, it is not suitable for tungsten oxide films to be incorporated into a tempered-glass manufacturing process.

A commercially available heat shielding glass is mainly a low radiation glass with single layer or double layer of silver, which is formed by sputtering silver, dielectric, and a protective film on the glass under a vacuum environment.

Therefore, the silver coating must be sealed between two pieces of glass filled with inert gas to prevent oxidation. However, if the inert gas leaks, the heat shielding performance will be negated and replacement of the gas assembly will be required.

Accordingly, a low-cost, highly stable IR reflective film which can be processed by a lower temperature is required.

BRIEF SUMMARY OF THE INVENTION

An embodiment of the invention provides a method for manufacturing a heat shielding material, comprising: providing a tungsten oxide precursor solution containing a group VIII B metal element; drying the tungsten oxide precursor solution to form a dried tungsten oxide precursor; and subjecting the dried tungsten oxide precursor to a reducing gas at a temperature of 100° C. to 500° C. to form a composite tungsten oxide.

Another embodiment of the invention provides a heat shielding material, comprising: composite tungsten oxide doped with a group I A or II A metal, represented by $M_xWO_y$, wherein M refers to at least one of a group I A or II A metal, W refers to tungsten, O refers to oxygen, and $0<x\leq1$, and $2.2\leq y\leq3$; and a group VIII B metal element.

Another embodiment of the invention provides a heat shielding material, comprising: composite tungsten oxide doped with a group I A or II A metal, represented by $M_xWO_yA_z$, wherein M refers to at least one of a group I A or II A metal, W refers to tungsten, O refers to oxygen, and A refers to a halogen element, and $0<x\leq1$, $2.2\leq y+z\leq3$, and $0<Z\leq0.2$; and a group VIII B metal element.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
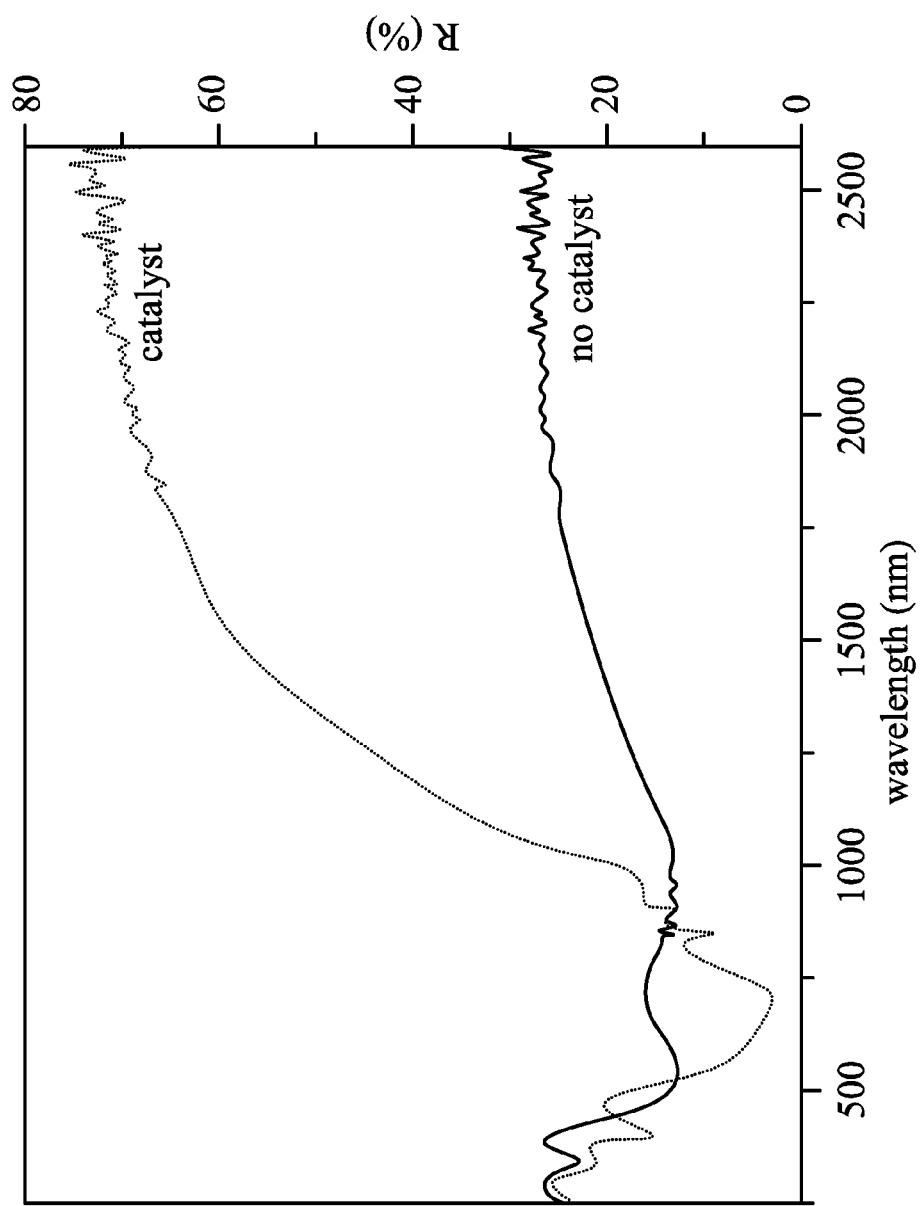
FIG. 1 is a UV-VIS-IR spectrum of the tungsten oxide film with or without adding a group VIII B metal catalyst during the manufacturing process in accordance with an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

In an embodiment of the invention, a group VIII B metal catalyst is added to form a composite tungsten oxide film to reduce formation temperature of the composite tungsten oxide, such that an IR reflective coating may be formed at a temperature of below about 500° C. Embodiments of manufacturing the composite tungsten oxide film are described in detail below.

In an embodiment, the group VIII B metal catalyst is first added to a mixed solution of a tungsten oxide precursor and a I A or II A metal salt to form a tungsten oxide precursor solution. The group VIII B metal catalyst described above may be added to the precursor solution in a form of metal, metal oxide, or metal salt. For example, the group VIII B metal catalyst may comprise Pt, $PtO_2$, $H_2PtCl_6$, $H_2O$, $H_2PtCl_6 \cdot 6H_2O$, $N_2O_6Pt$, $PtCl_4$, $C_4H_6O_4Pt$, Ni, NiO, $Ni_2CO_3$, $C_4H_6O_4Ni \cdot 4H_2O$, $NiCl_2$, $H_8N_2NiO_8S_2 \cdot 6H_2O$, $NiCl_2 \cdot 6H_2O$, $NiF_2$, $NiBr_2$, $NiCl_6 \cdot 6H_2O$, Rh, $Rh_2O_3$, $RhCl_3 \cdot H_2O$, $N_3O_9Rh$, $C_4H_9O_6Rh$, Pd, PdO, $H_2O_2Pd$, $N_2O_6Pd$, $PdBr_2$, $C_4H_6O_4Pd$, $PdCl_2$, or a combination thereof. The additional amount of the group WEB metal catalyst may be between about 0.001 to 1 wt %.

The tungsten oxide precursor may comprise ammonium metatungstate, ammonium orthotungstate, ammonium paratungstate, alkali metal tungstate, tungstic acid, tungsten silicide, tungsten sulfide, tungsten oxychloride, tungsten alkoxide, tungsten hexachloride, tungsten tetrachloride, tungsten bromide, tungsten fluoride, tungsten carbide, tungsten oxycarbide, or a combination thereof.

The group I A or II A metal salt is represented by a formula of $M_pN$, wherein M is a group I A or II A metal element comprising lithium (Li), sodium (Na), potassium (K), rubidium (Rb), cesium (Cs), beryllium (Be), magnesium (Mg), calcium (Ca), atrontium (Sr), barium (Ba), or a combination thereof, and N is an anion or an anion group with negative valence, and $0.5 \leq p \leq 12$. The group I A or II A metal salt comprises group I A or II A metal carbonate, group I A or II A metal hydrogen carbonate, group I A or II A metal nitrate, group I A or II A metal nitrite, group I A or II A metal hydroxide, group I A or II A metal halide, group I A or II A metal sulfate, group I A or II A metal sulfite, or a combination thereof. A molar ratio of the tungsten oxide precursor and group I A or II A metal salt may be between 0.05 and 1, preferably between 0.2 and 0.8.

In one embodiment, the tungsten oxide precursor and group I A or II A metal salt may be added into distilled water and thoroughly mixed. Then, the pH value of the mixed solution is adjusted to over 7 and preferably about 9-12 by an organic base or an inorganic base. Then, the group VIII B metal catalyst is added into the mixed solution (alternatively, the catalyst may be added before the pH adjustment) to obtain the tungsten oxide precursor solution. The organic base may comprise organic amines such as dimethyl amine, trimethyl amine, piperidine, morpholino, triethyl amine, pyridine and so on. The inorganic base may comprise ammonia, hydroxide of group I A or II A metal, carbonate of group I A or II A metal, bicarbonate of group I A or II A metal, or the like. For example, sodium bicarbonate, potassium bicarbonate, lithium carbonate, sodium carbonate, potassium carbonate, lithium hydroxide, sodium hydroxide, potassium hydroxide, barium hydroxide, or the like.

In another embodiment of the invention, a heat shielding material doped with halogen may also be formed. In this case, in the preparation steps of the tungsten oxide precursor solution described above, halogen salt may be added thereto. The halogen containing tungsten oxide precursor solution is then coated onto a substrate and dried to form a film. The additional amount of halogen salt may be between about 0.1 and 20 mol %, wherein being between 1 and 15 mol % is preferred. The halogen salt described above is represented by a formula of $PA_q$, wherein A is a halogen element comprises fluorine (F), chlorine (Cl), bromine (Br), or iodine (I), and P is a cation or a cation group with positive valence, and $1 \leq q \leq 12$. The halogen salt may comprise ammonium halide, alkylammonium salt, halocarbon, hydrogen halide, tungsten halide, benzene halide, halogenated aromatic, or alkyl halide.

Then, the tungsten oxide precursor solution is coated onto a substrate. The coating procedure can be achieved by various wet coating techniques such as spin coating, casting, bar coating, blade coating, roller coating, wire bar coating, dip coating, or the like. The substrate described above may comprise glass substrate, transparent resin substrate, or a combination thereof. In one embodiment of the invention, the glass substrate may be tempered glass. In another embodiment of the invention, the transparent resin substrate may comprise polyester, polyimide resin, acrylic resin, epoxy resin, silicone resin, phenoxy resin, urethane resin, urea resin, acrylonitrile butadiene atyrene (ABS) resin, polyvinyl butyral (PVB) resin, polyether resin, florine-containing resin, polycarbonate, polystyrene, polyamide, starch, cellulose, a copolymer thereof, a mixture thereof, or the like.

After the coating step, the substrate is dried in an oven at a temperature of about 25 to 200° C. for about 0.5 to 30 minutes, thus forming a film with a pyrochlore structure which does not hinder IR reflective performance.

The dried film is placed in reducing gas for reduction reaction at a temperature of about 100 to 500° C., preferably about 250 to 500° C. The reducing gas may be gas such as hydrogen, wherein the percentage of hydrogen may be about 1 to 100% (vol). The reducing process proceeds for about 10 to 480 minutes, preferably about 20 to 240 minutes. After the reduction, the pyrochlore structure of the film transforms into a hexagonal structure. An IR reflective and transparent film is then formed. Usually, the higher the reduction temperature, the shorter the reaction time. In other words, the reaction time needs to be extended if a lower reduction temperature is desired. Therefore, the reduction time and temperature can be adjusted depending on the characteristics of the substrate or other processing needs. Therefore, the manufacturing process can be integrated into the present manufacturing process of tempered glass or other transparent substrates.

Since the conventional process of forming a composite tungsten oxide film requires a temperature of over about 500° C., the conventional process is not appropriate to be used in the heat shielding coating treatment of a tempered glass which requires a low temperature process. However, in an embodiment of the invention, the group MB metal catalyst (such as Pt) is added to reduce the formation temperature of the composite tungsten oxide film, such that the tungsten oxide film may be formed at a temperature of below about 300° C. Thus, applicability of the heat shielding film is increased; especially for tempered glasses.

Note that during the manufacturing process of the heat shielding material, the group VIII B metal catalyst is added and not removed. Therefore, the composite tungsten oxide film of the invention is characterized by containing a certain amount of the group VIII B metal catalyst, wherein the amount is usually between about 0.001 and 1 wt %, such as about 0.1 to 0.6 wt %. A transparency of the heat shielding film may be about 20 to 85%.

In an embodiment of the invention, the step of coating the tungsten oxide precursor solution on the substrate may be omitted. That is, the tungsten oxide precursor solution may be directly oven dried and subjected to a reducing gas for reduction. The reduction temperature may be between about 100 and 500° C., wherein a temperature of about 250 to 500° C. is preferred. Following, a composite tungsten oxide powder containing the group VIII B metal element is thus formed. The powder may be ground and dispersed into a medium such as a solvent or a resin to form nano-dispersion. Then, the nano-dispersion is coated onto glass or a transparent polymer substrate to form a transparent heat shielding film.

A heat shielding material according to an embodiment of the invention comprises composite tungsten oxide doped with a group I A or II A metal, represented by formula (I):

$$M_xWO_y \qquad (I)$$

wherein M refers to at least one of a group I A or II A metal, W refers to tungsten, O refers to oxygen, and $0<x\leq1$, and $2.2\leq y\leq3$. Furthermore, a group VIII B metal element of the heat shielding material is about 0.001 to 1 wt % of the composite tungsten oxide, preferably about 0.1 to 0.6 wt %. The formed heat shielding material has good IR reflection at a wavelength over about 780 nm. In particular, the IR reflection at about 1400 to 2600 nm may be about 50 to 70%, or even above 70%.

Moreover, a heat shielding material according to another embodiment of the invention comprises composite tungsten oxide doped with a group I A or II A metal and halogen, represented by formula (II):

$$M_xWO_yA_z \quad (II)$$

wherein M refers to at least one of a group I A or II A metal, W refers to tungsten, O refers to oxygen, A refers to a halogen element, and $0<x\leq1$, $2.2\leq y+z\leq3$ and $0<Z\leq0.2$. A group VIII B metal element of the heat shielding material is about 0.001 to 1 wt % of the composite tungsten oxide, preferably about 0.1 to 0.6 wt %. The heat shielding material described above may be in the form of a powder or a film.

In view of the above, the invention provides a low-temperature process for forming a heat shielding film and a heat shielding film formed thereby. The conventional heat shielding glass formed by vacuum coating requires a high cost and multilayered formations. In comparison, the heat shielding material of the invention requires only a single layered coating. Thus, the process is easier, and the cost is lower. Further, since the inert gas for preventing oxidation is not needed in the present invention, stability and durability of the glass can be higher.

In addition, compared to the composite tungsten oxide film without using the group VIII B metal catalyst during a formation process thereof, the composite tungsten oxide film using the group VIII B metal catalyst may reduce the temperature of the reduction reaction. The traditional composite tungsten oxide needs to be formed at a temperature of over about 500° C., and can not be applied to manufacturing of a tempered glass. However, the composite tungsten oxide film of the invention may be formed at a temperature of lower than about 500° C., or even lower than about 300° C., with superior IR reflection. Thus, the composite tungsten oxide film of the invention may be used in more applications. The composite tungsten oxide film of the invention has superior IR reflection at a wavelength higher than about 780 nm. In particular, at a wavelength of about 1400 to 2600 nm, the IR reflection may reach about 50 to 70%, or even above 70%.

Comparative Example 1

5 g of ammonium metatungstate and 1.1 g of cesium carbonate was added into 40 mL of distilled water and thoroughly mixed. The pH value of the mixture was adjusted to 12 by an $NH_4OH$ aqueous solution, and a tungsten oxide precursor solution (without the group VIII B metal catalyst) was provided. The tungsten oxide precursor solution was coated onto a glass substrate by dipping coating and then oven dried at a temperature of 120° C. Finally, the dried substrate was subjected to 10% (vol) of $H_2/Ar$ at 400° C. for 60 minutes to form a composite tungsten oxide film. The Ultraviolet-Visible-Infrared (UV-VIS-IR) spectrum of the composite tungsten oxide film was measured by a SHIMADZU (UV-3600) for wavelengths between 240 to 2600 nm with a Scan spacing of 5 nm.

Example 1

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2/Ar$ at 400° C. for 60 minutes to form a composite tungsten oxide film. A UV-VIS-IR spectrum of the composite tungsten oxide film is shown in FIG. 1.

FIG. 1 illustrates the IR reflection of the composite tungsten oxide films with or without the catalyst. As shown in FIG. 1, the IR reflection of the composite tungsten oxide film with Pt, the group VIII B metal catalyst, is much higher than the IR reflection of the composite tungsten oxide film without the catalyst. That is, adding the group VIII B metal catalyst can effectively improve the IR reflection of the composite tungsten oxide film, with good transparency.

Example 2

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2/Ar$ for 60 minutes to form a composite tungsten oxide film. The reduction temperature was 260° C., 300° C., 400° C., or 500° C., respectively. The UV-VIS-IR spectrum of the composite tungsten oxide film is shown in FIG. 2.

Figure 2:
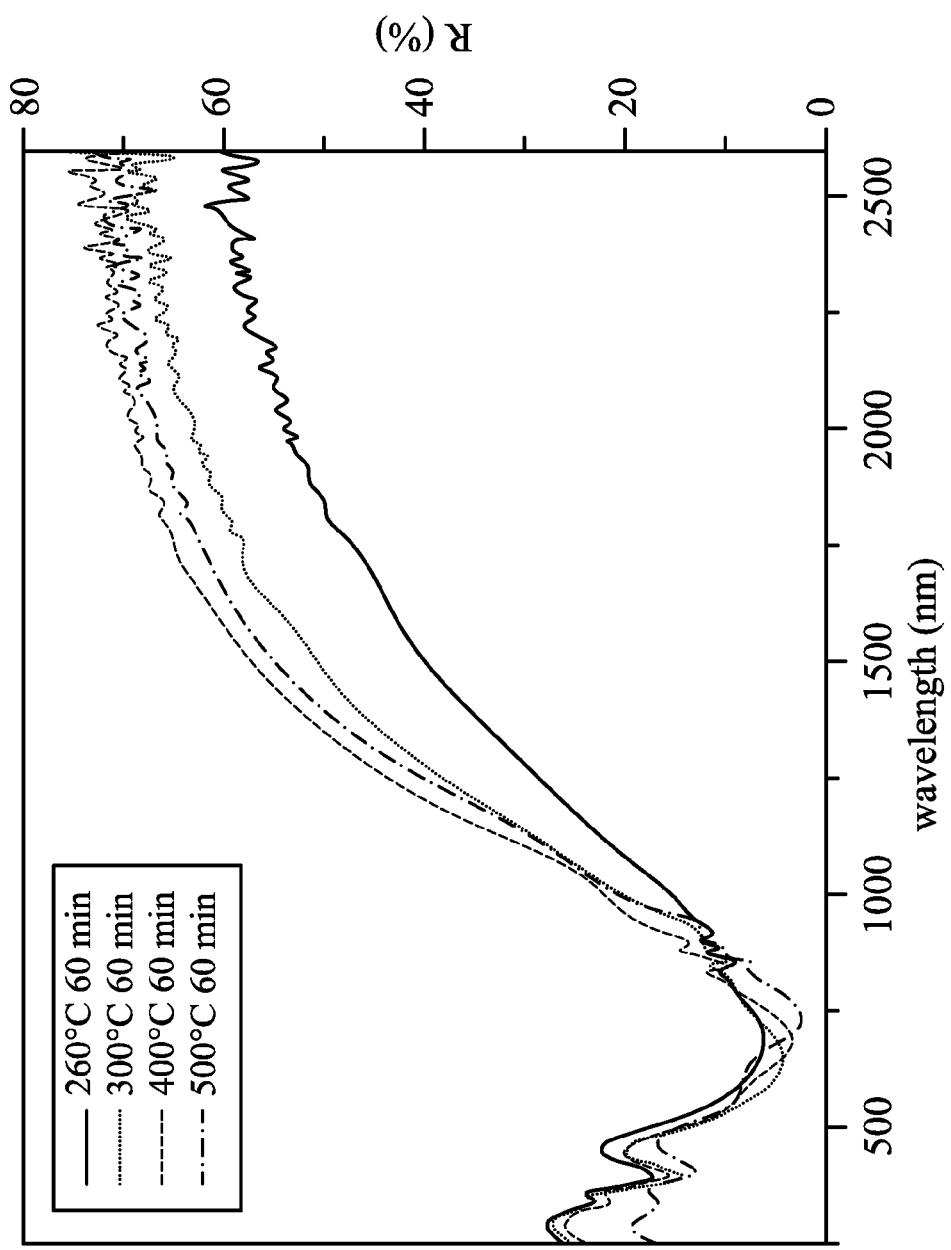
FIG. 2 illustrates the IR reflection of the tungsten oxide film formed under various reduction temperatures in accordance with an embodiment of the invention.

FIG. 2 illustrates the IR reflection of the composite tungsten oxide films formed at different reduction temperatures. As shown in FIG. 2, the composite tungsten oxide films formed at different reduction temperatures all have superior IR reflection.

Example 3

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2/Ar$ at 300° C. to form a composite tungsten oxide film reacting at different reactions time. The variation of the IR reflection of the tungsten oxide film formed with different reduction times during the forming process is shown in FIG. 3.

Figure 3:
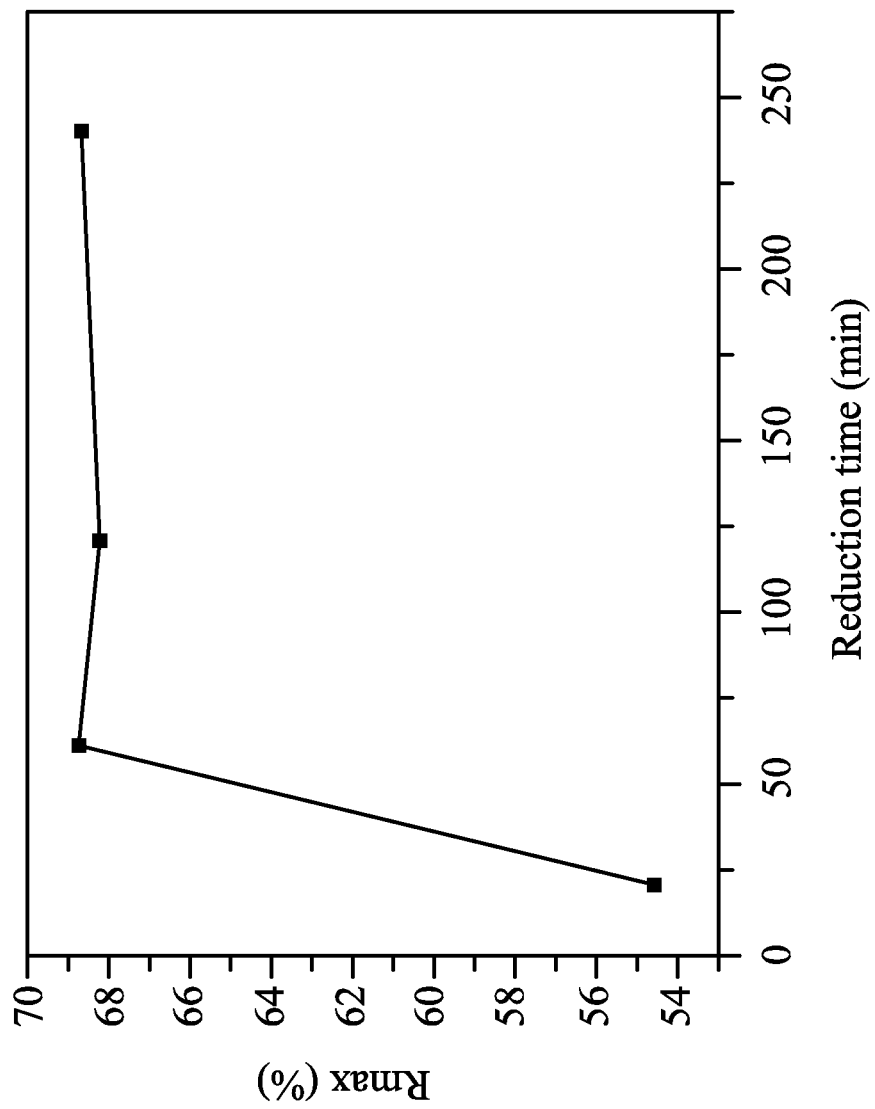
FIG. 3 illustrates the IR reflection of the tungsten oxide film formed under various reduction time in accordance with an embodiment of the invention.

As shown in FIG. 3, the IR reflection of the tungsten oxide film can reach about 70% when the reduction reaction lasts for 60 minutes at a temperature of 300° C. Accordingly, adding the group VIII B metal catalyst can reduce the reduction temperature thereof and therefore increase applicability.

Example 4

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2$/Ar to form a composite tungsten oxide film. The reduction temperature was at 260° C., 300° C., 400° C., or 500° C., respectively, and the reaction time was 240 or 60 minutes. The UV-VIS-IR spectrum of the composite tungsten oxide film is shown in FIG. 4.

Figure 4:
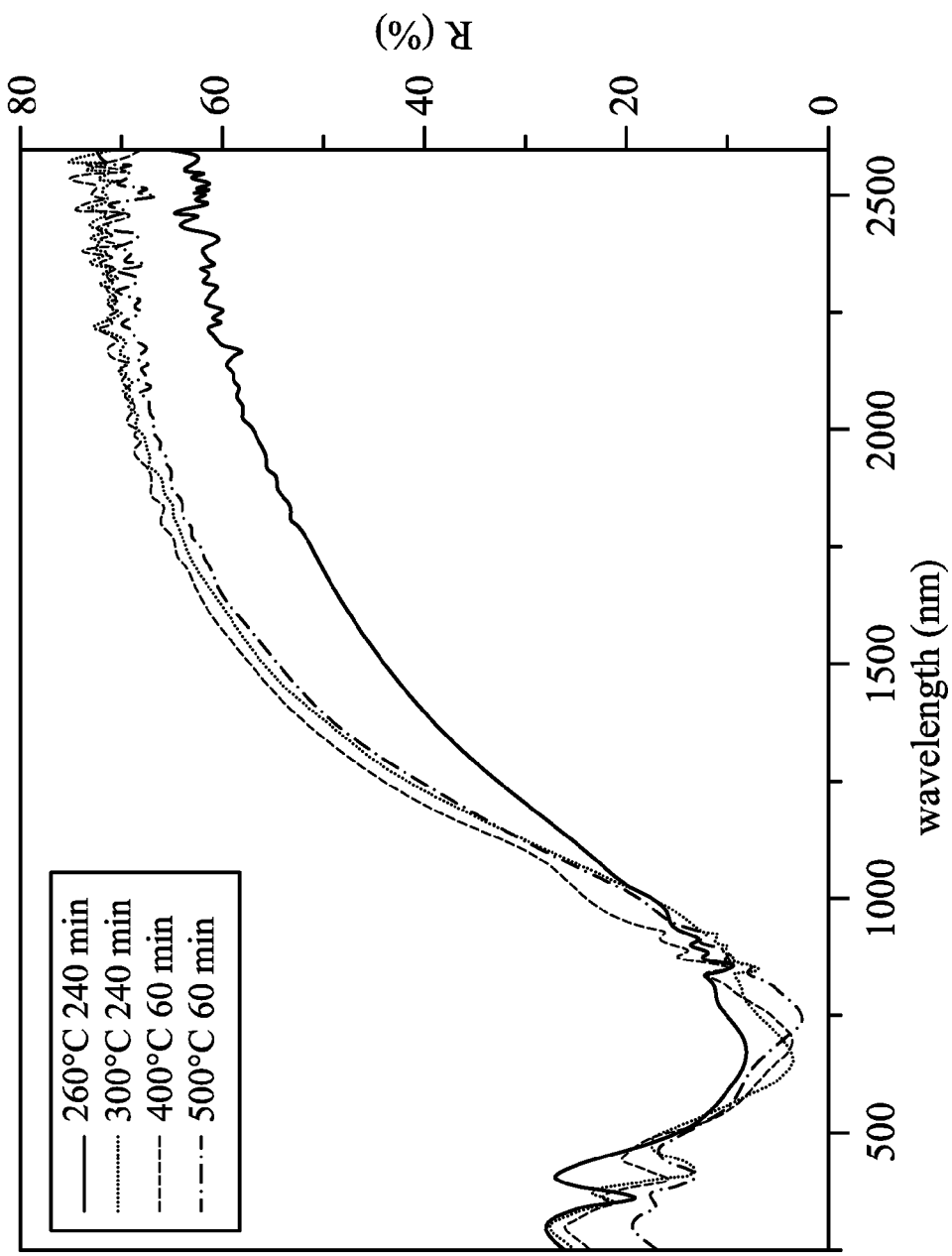
FIG. 4 illustrates the IR reflection of the tungsten oxide film formed under different reduction temperatures and different reduction times in accordance with an embodiment of the invention.

FIG. 4 illustrates the IR reflection of the composite tungsten oxide films formed at different reduction temperatures for different reduction times. When a lower reduction temperature was required, the IR reflection of the composite tungsten oxide film may be increased by having a longer reduction time. When the reduction temperature was high, a shorter reduction time can achieve a desired IR reflection. Therefore, the reduction time and temperature can be adjusted according to applications.

Example 5

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2$/Ar at 400° C. for 60 minutes to form a composite tungsten oxide film. A accelerated weathering testers (QUV) test chamber was used to test the durability of the composite tungsten oxide film for exposure under QUV for 150, 600, 1000, 2000 hrs. Then, a UV-VIS-IR was used. After continuous exposure in the QUV test chamber, the composite tungsten oxide film still had good transparency and IR reflection.

Therefore, the composite tungsten oxide film of the invention did not tend to oxidize as those conventional heat shielding glass with silver coating. Forming a conventional heat shielding glass requires sealing of a silver coating into the inert gas between two layers of glass to prevent the oxidation of the silver coating. Once the inert gas between the two layers of glass leaks out, the glass no longer has the ability of heat shielding. However, in this invention, a multilayered glass and the inert gas is not required, and thus, the composite tungsten oxide film of the invention can have superior stability and durance.

Example 6

Figure 5:
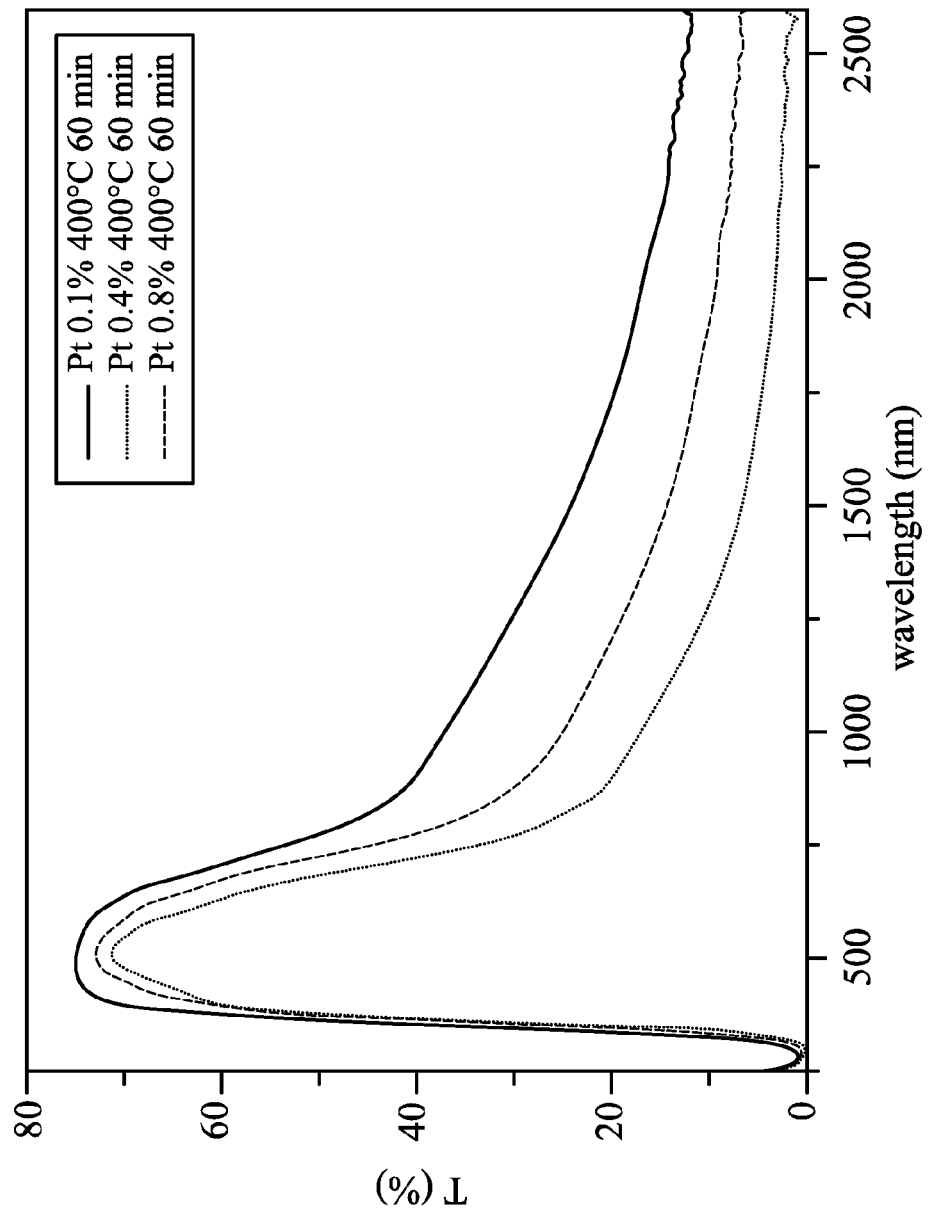
FIGS. 5-6 illustrate the IR reflection of the tungsten oxide film after adding different amounts of catalysts during the manufacturing process in accordance with an embodiment of the invention.
Figure 6:
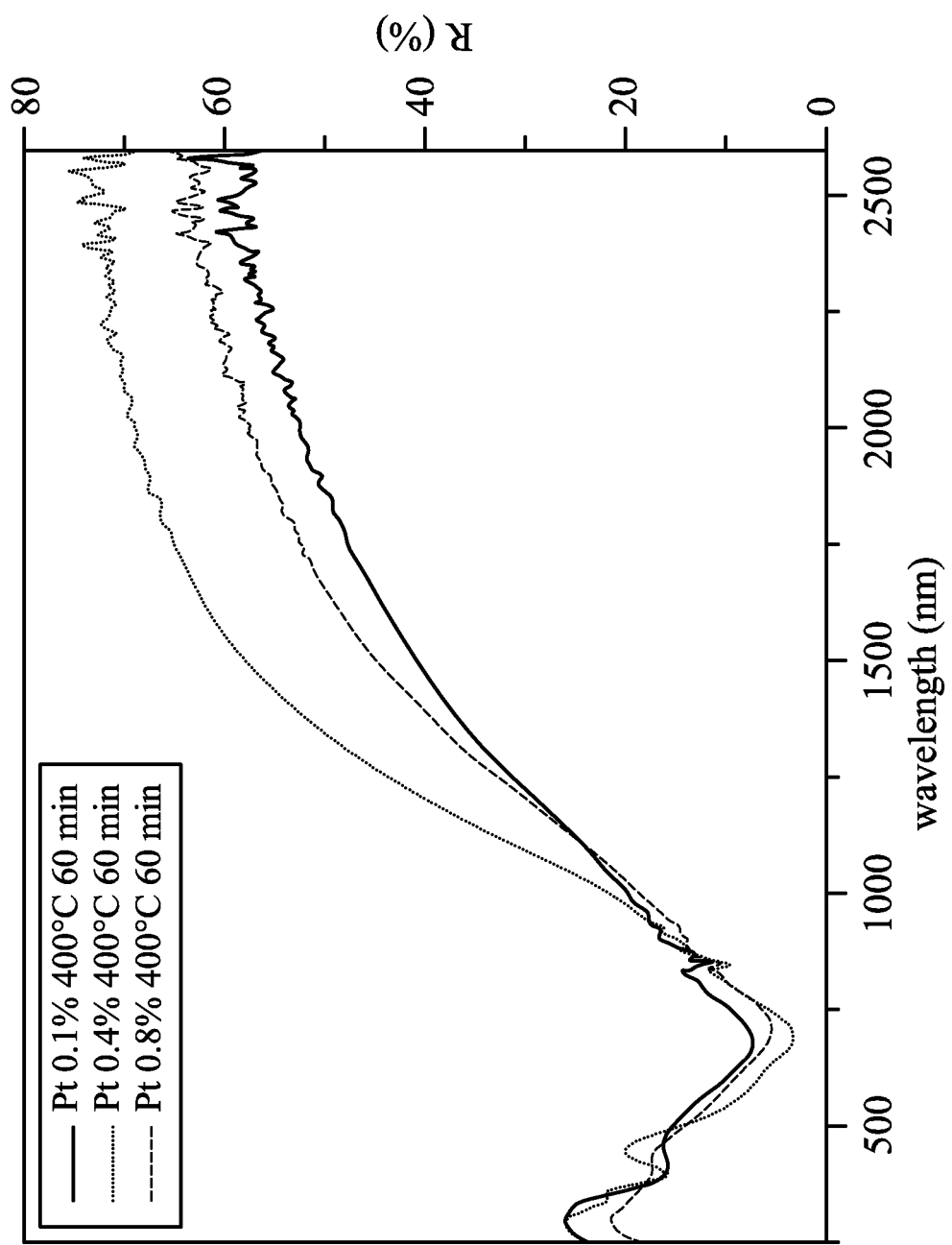

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.1, 0.4, 0.8 wt % of $H_2PtCl_6.H_2O$ was added into the mixture respectively to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2$/Ar at 400° C. for 60 minutes to form a composite tungsten oxide film. A UV-VIS-IR was used to examine the IR reflection and transparency of the tungsten oxide film. As shown in FIG. 5 and FIG. 6, only a small amount of the catalyst is required to achieve a desired heat shielding ability.

Example 7

Figure 7:
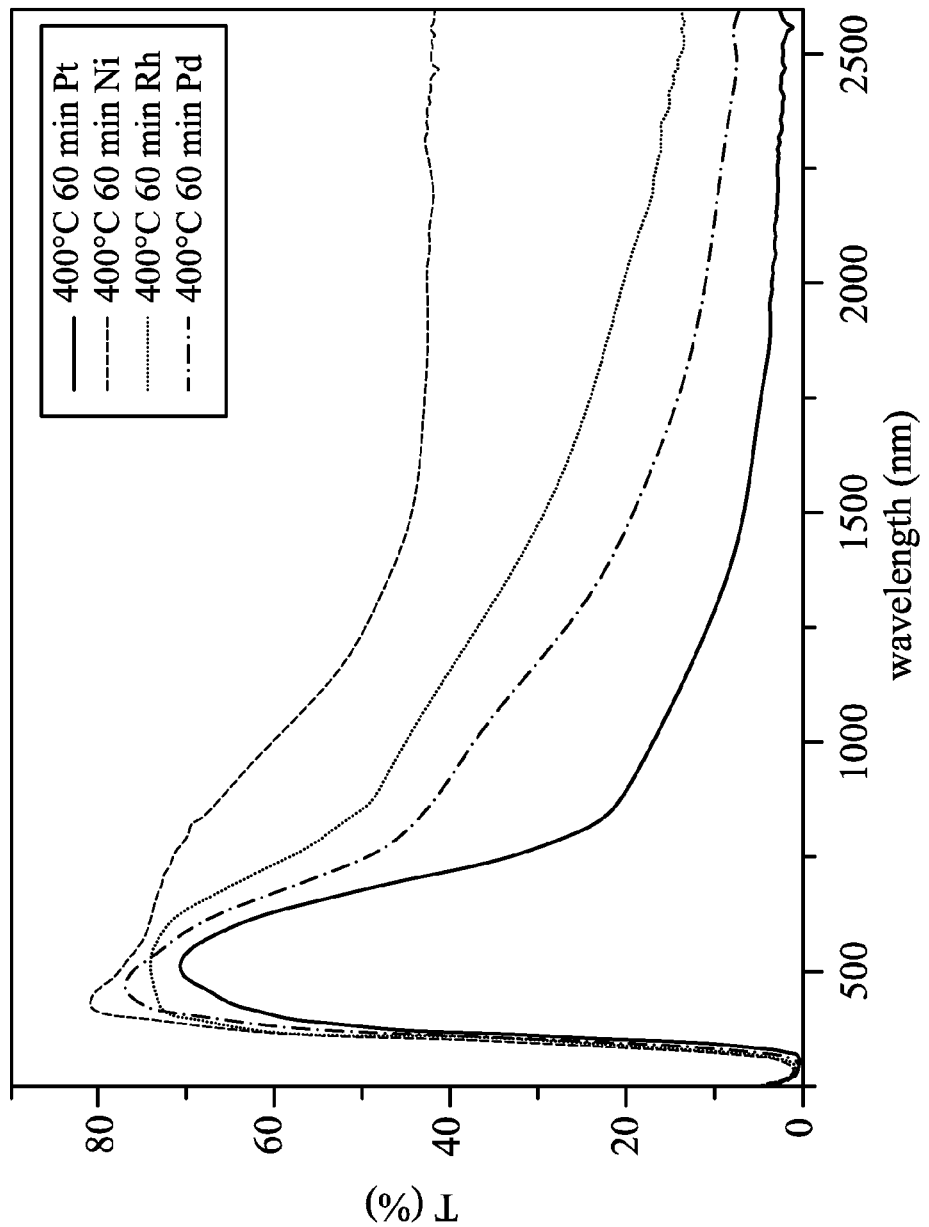
FIGS. 7-8 illustrate the IR reflection of the tungsten oxide film after adding different catalysts during the manufacturing process in accordance with an embodiment of the invention.
Figure 8:
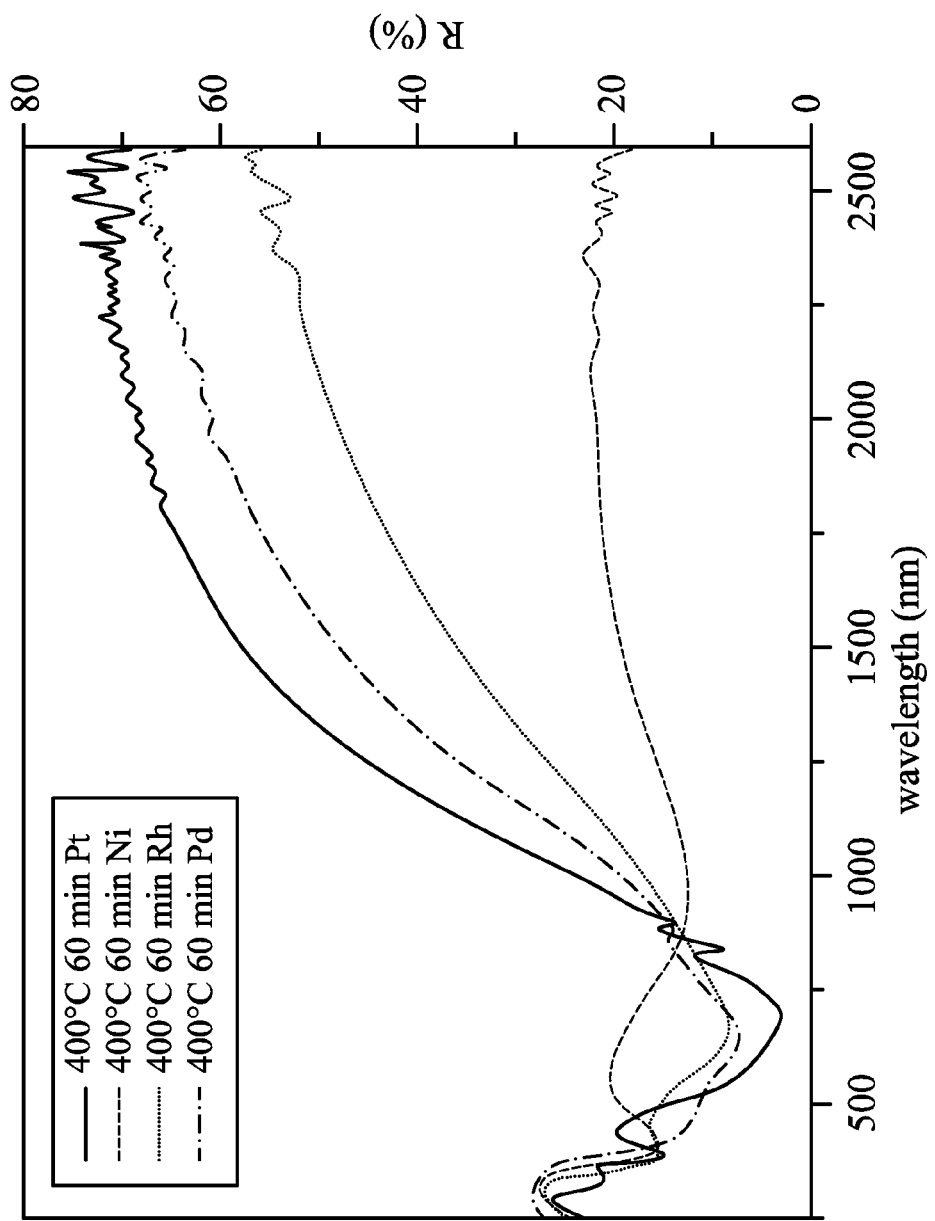

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of group VIM metal catalyst was added into the mixture to form a tungsten oxide precursor solution, wherein the group VIII B metal catalyst was $H_2PtCl_6.H_2O$, $NiCl_6.6H_2O$, $RhCl_3.H_2O$, or $PdCl_2$, respectively. The tungsten oxide precursor solution was coated onto a glass substrate by dipping coating and then oven dried at a temperature of 120° C. Finally, the dried substrate was subjected to 10% (vol) of $H_2$/Ar at 400° C. for 60 minutes to form a composite tungsten oxide film. A UV-VIS-IR was used to examine the IR reflection and transparency of the formed tungsten oxide film. As shown in FIG. 7 and FIG. 8, adding different kinds of group VIII B metal catalysts during the manufacturing process can improve the IR reflection of the formed composite tungsten oxide film.

Example 8

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2$/Ar for 20 minutes to form a composite tungsten oxide film. The reduction temperature was at 260° C., 300° C., 400° C., or 500° C., respectively.

Meanwhile, the tungsten oxide precursor solution without $H_2PtCl_6$. $H_2O$ was also prepared as a comparative example. The tungsten oxide precursor solution formed without catalyst was coated onto a glass substrate by dipping coating and then oven dried at a temperature of 120° C. Finally, the dried substrate was subjected to 10% (vol) of $H_2$/Ar for 20 minutes to form a composite tungsten oxide film. The reduction temperature was at 400° C. or 500° C., respectively.

Figure 9:
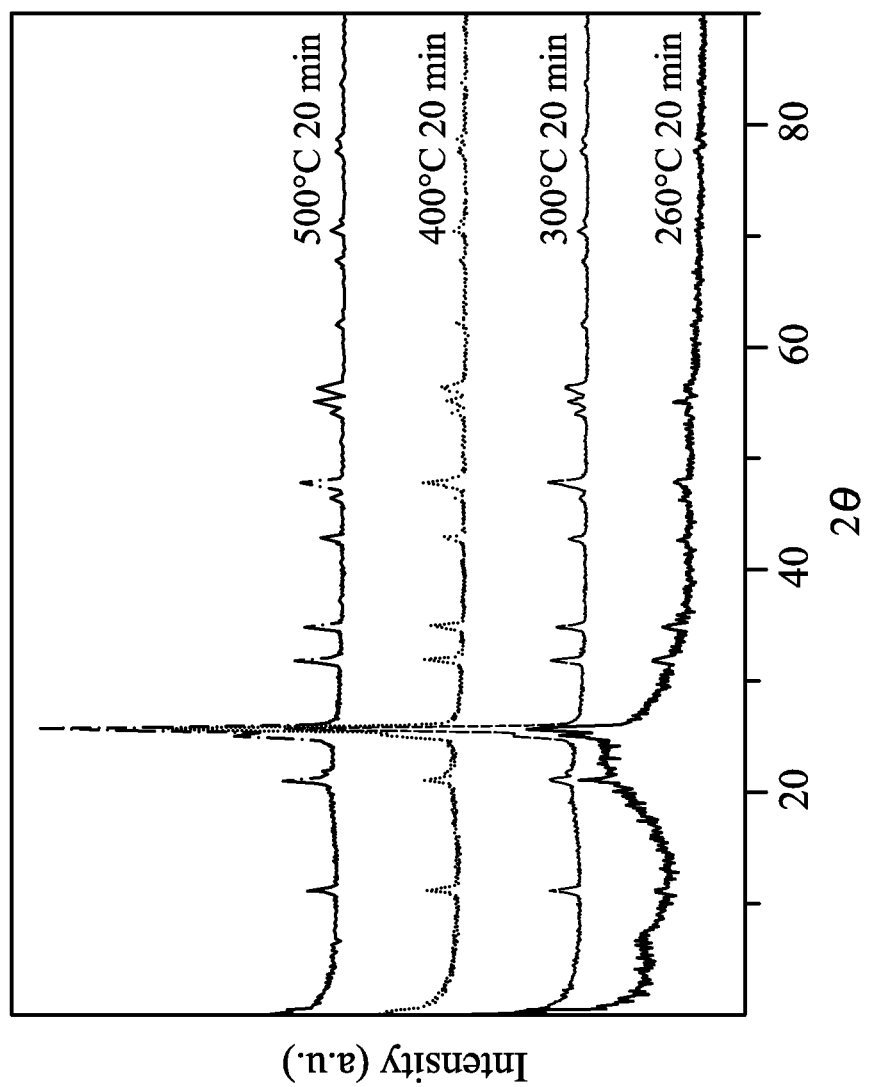
FIGS. 9-10 illustrates the XRD spectra of the tungsten oxide film with or without adding a group VIII B metal catalyst during the manufacturing process in accordance with an embodiment of the invention.
Figure 10:
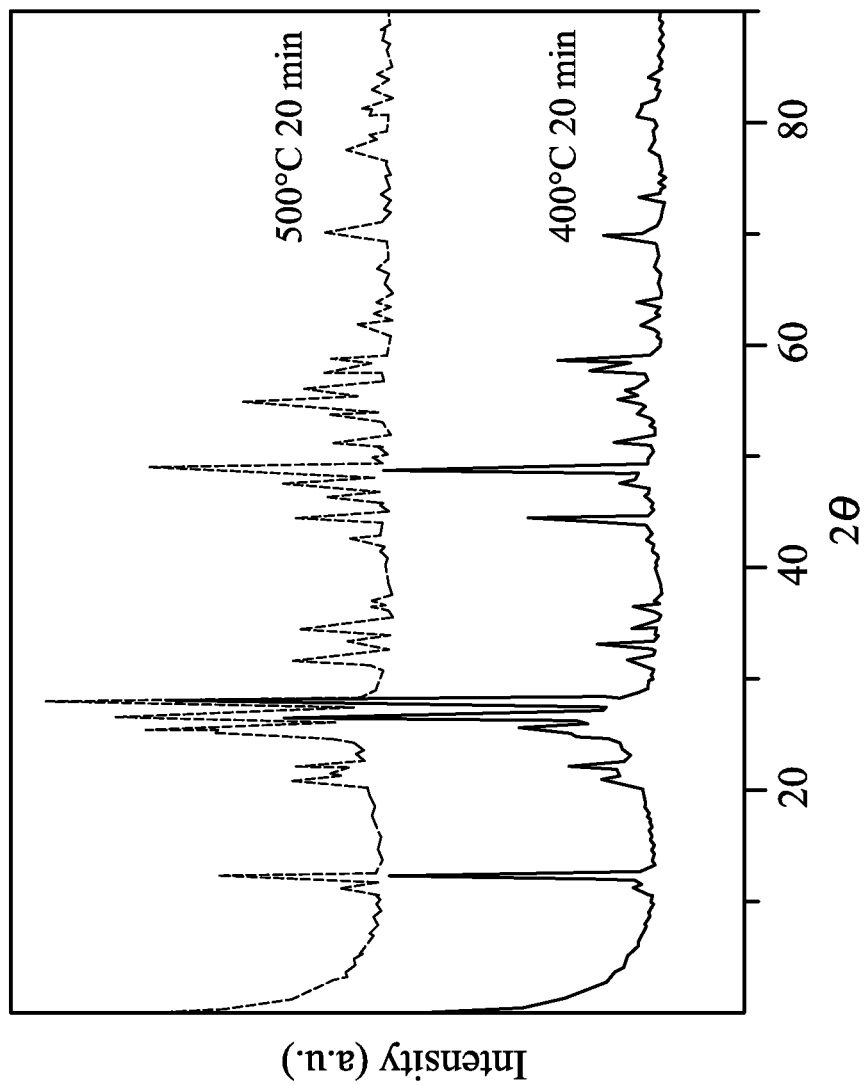

An XRD spectrometer was used to analyze the structures of the tungsten oxide film formed with or without the catalyst. As shown in FIG. 9, after reacting at 300° C. for 20 minutes, the structure of the composite tungsten oxide film with the catalyst, transformed into a hexagonal structure, which is the IR reflective structure. However, as shown in FIG. 10, the composite tungsten oxide film formed without the catalyst did not transform into the hexagonal structure even after reacting at a temperature of 400° C. or even 500° C.

Example 9

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6.H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2$/Ar to form a composite tungsten oxide film. The reduction condition was at a temperature of 260° C., 300° C., 400° C., or 500° C., respectively, and the reaction time varied. After various reaction time (at a temperature of 260° C. or 300° C. for 240 min; at a temperature of 400° C. or 500° C. for 60 min), the composite tungsten oxide film was formed.

Figure 11:
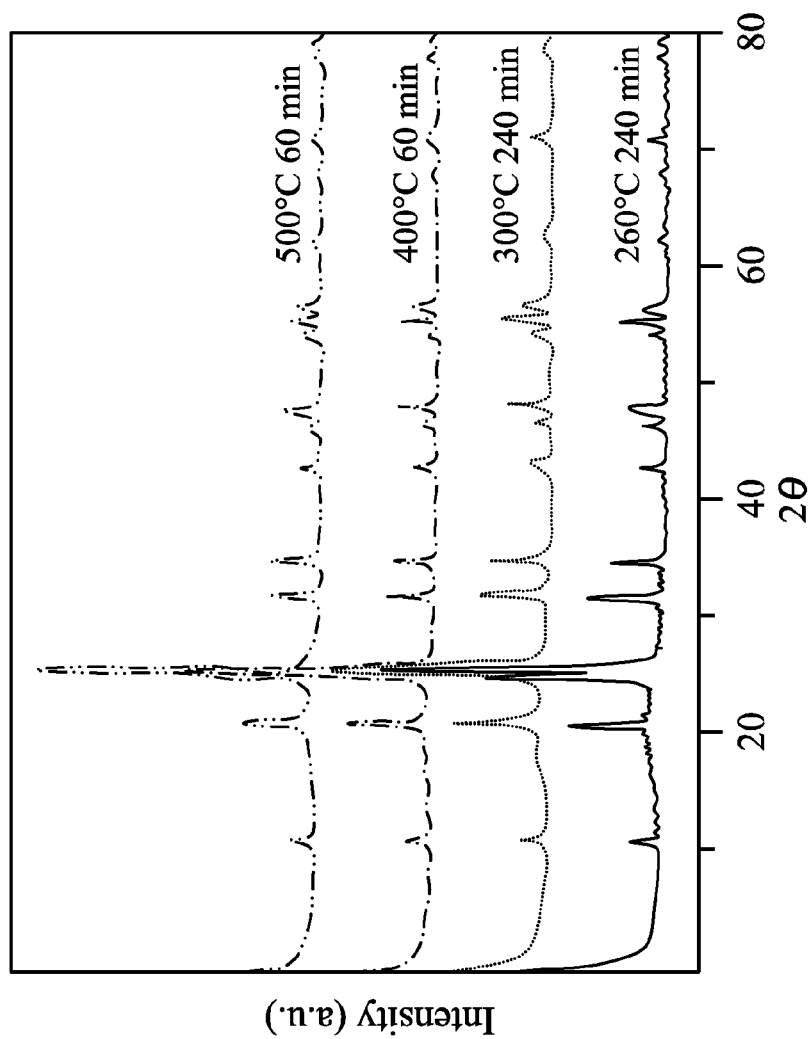
FIG. 11 illustrates the XRD of the tungsten oxide film formed under, low reduction temperature in a best mode in accordance with an embodiment of the invention.

FIG. 11 illustrates the XRD spectrum of the composite tungsten oxide films at a best IR reflection mode at different reduction temperatures. As shown in FIG. 11, the lower reduction temperature requires the longer reduction time, and the higher reduction temperature requires the shorter reduction time.

Compared to the conventional tungsten oxide film which requires reduction reaction to occur at a temperature of over 500° C., the reduction time and temperature of the invention may be adjusted during the formation of the tungsten oxide film. Moreover, the formed tungsten oxide film can have superior IR reflection. Thus, applicability of the heat shielding film is increased.

Example 10

5 g of ammonium metatungstate and 1.1 g of cesium carbonate was added into 40 mL of distilled water and thoroughly mixed. 1 mol %, 3 mol %, 5 mol %, or 10 mol % of the $NH_4Cl$ was also added into the mixture, respectively. The pH value of the mixture was adjusted to 12 by an $NH_4OH$ aqueous solution. 0.4 wt % of $H_2PtCl_6 \cdot H_2O$ was added into the mixture to form a tungsten oxide precursor solution. The tungsten oxide precursor solution was coated onto a glass substrate by dipping coating and then oven dried at a temperature of 120° C. Finally, the dried substrate was subjected to 10% (vol) of $H_2/Ar$ at 400° C. for 60 minutes to form a composite tungsten oxide film A UV-VIS-IR was used to detect the transparency and IR reflection of the composite tungsten oxide film.

Figure 12:
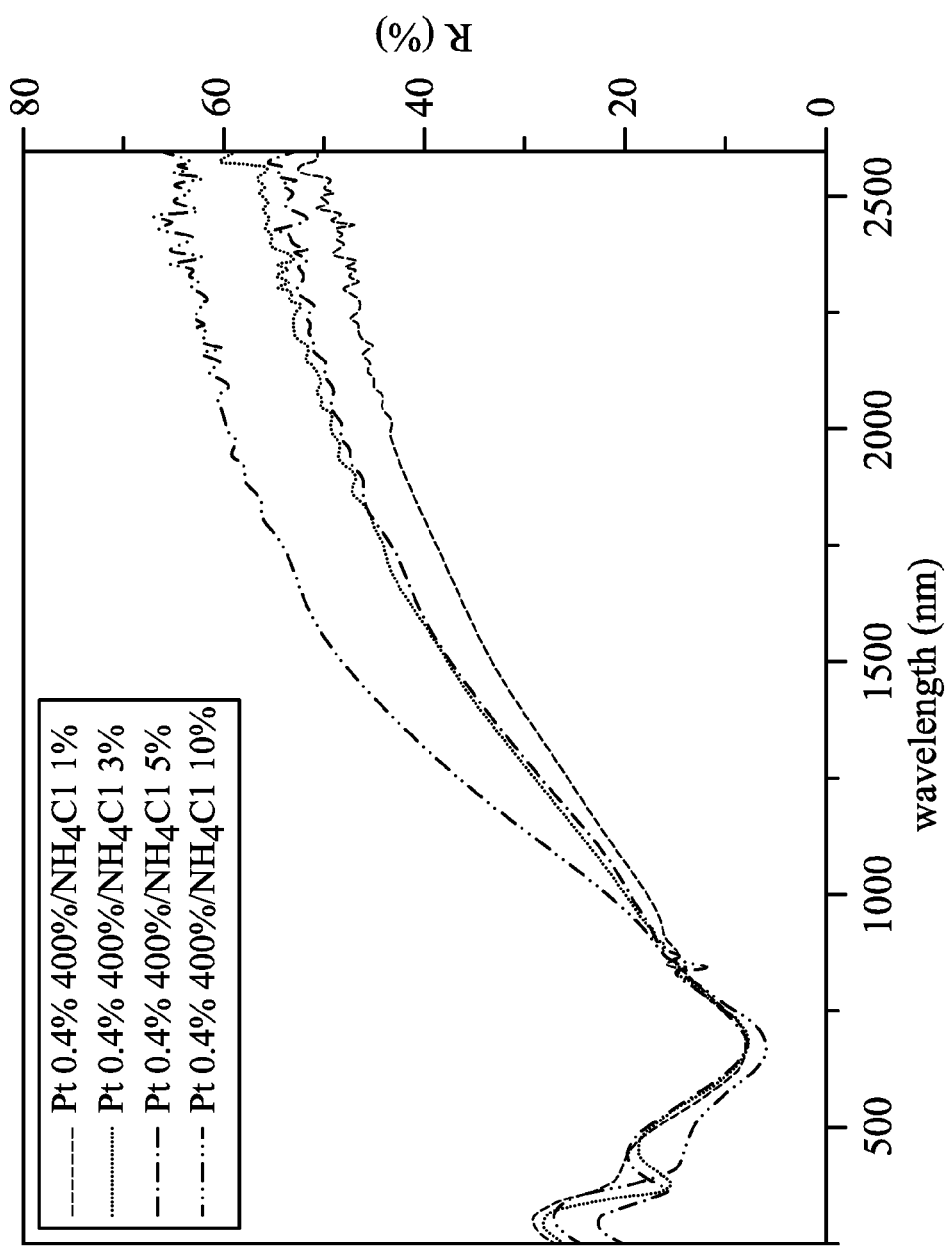
FIG. 12 illustrates the IR reflection of the composite tungsten oxide film after adding halogen salt during the manufacturing process in accordance with an embodiment of the invention.

FIG. 12 illustrates the IR reflection of the composite tungsten oxide film with halogen salt. As shown in FIG. 12, the composite tungsten oxide film with different amounts of halogen salt can still have superior IR reflection.

Example 11

An ESCA (Electron Spectroscopy for Chemical Analysis) was used to analyze the composition of the composite tungsten oxide film described above by a VS Scientific Microlab 310F. The detection depth was inside of 50 Å. The equipment was used to detect the amounts of the group VIII B catalyst which remained inside the composite tungsten oxide films formed in the examples. The result of ESCA was as followed: 21.22 mol % of W, 63.48 mol % of O, 10.75 mol % of Cs, and 4.55 mol % of Pt, confirming the existence of the Pt catalyst in the composite tungsten oxide film.

Example 12

5 g of ammonium metatungstate and 1.1 g of cesium carbonate was added into 40 mL of distilled water and thoroughly mixed. The pH value of the mixture was adjusted to 12 by an $NH_4OH$ aqueous solution. 0.4 wt % of $H_2PtCl_6 \cdot H_2O$ was added into the mixture to form a tungsten oxide precursor solution. The tungsten oxide precursor solution was oven dried at a temperature of 13° C. Finally, the dried substrate was subjected to 10% (vol) of $H_2/Ar$ at 400° C. for 60 minutes to form a composite tungsten oxide film.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat shielding material, comprising:
   (i) a composite tungsten oxide doped with a group I A or II A metal, represented by formula (I):

$$M_xWO_y \qquad (I),$$

wherein M refers to at least one of a group I A or II A metal, W refers to tungsten, O refers to oxygen, and $0 < x \leq 1$, and $2.2 \leq y \leq 3$;
   (ii) a group VIII B metal element; and
   (iii) a glass or a transparent polymer substrate,
   wherein the heat shielding material provides at least 50% reflectance at an IR wavelength of about 1400-2600 nm.

2. The heat shielding material as claimed in claim 1, wherein the heat shielding material is manufactured by a method comprising:
   providing a tungsten oxide precursor solution containing a group VIII B metal element;
   coating the tungsten precursor solution on the glass or the transparent polymer substrate;
   drying the tungsten oxide precursor solution to form a dried tungsten oxide precursor; and
   subjecting the dried tungsten oxide precursor to a reducing gas at a temperature of 100° C. to 500° C. to form the composite tungsten oxide.

3. The heat shielding material as claimed in claim 1, wherein the heat shielding material is a film.

* * * * *